United States Patent
Sun et al.

(10) Patent No.: US 10,318,797 B2
(45) Date of Patent: Jun. 11, 2019

(54) IMAGE PROCESSING APPARATUS AND IMAGE PROCESSING METHOD

(71) Applicant: CANON KABUSHIKI KAISHA, Tokyo (JP)

(72) Inventors: Donghui Sun, Beijing (CN); Xian Li, Beijing (CN); Dongchao Wen, Beijing (CN)

(73) Assignee: Canon Kabushiki Kaisha, Tokyo (JP)

(*) Notice: Subject to any disclaimer, the term of this patent is extended or adjusted under 35 U.S.C. 154(b) by 380 days.

(21) Appl. No.: 15/351,864

(22) Filed: Nov. 15, 2016

(65) Prior Publication Data

US 2017/0140210 A1    May 18, 2017

(30) Foreign Application Priority Data

Nov. 16, 2015 (CN) .......................... 2015 1 0784143

(51) Int. Cl.
| | |
|---|---|
| *G06K 9/00* | (2006.01) |
| *G06T 7/00* | (2017.01) |
| *G06K 9/32* | (2006.01) |
| *G06K 9/46* | (2006.01) |
| *G06T 7/68* | (2017.01) |

(52) U.S. Cl.
CPC ..... *G06K 9/00268* (2013.01); *G06K 9/00228* (2013.01); *G06K 9/00302* (2013.01); *G06K 9/3233* (2013.01); *G06K 9/4642* (2013.01); *G06K 9/4671* (2013.01); *G06T 7/68* (2017.01); *G06T 2207/10004* (2013.01); *G06T 2207/30201* (2013.01)

(58) Field of Classification Search
None
See application file for complete search history.

(56) References Cited

U.S. PATENT DOCUMENTS

| | | | | |
|---|---|---|---|---|
| 6,633,655 | B1* | 10/2003 | Hong | G02B 27/225 |
| | | | | 382/118 |
| 9,965,860 | B2* | 5/2018 | Nguyen | G06F 3/013 |
| 2005/0135679 | A1* | 6/2005 | Yoon | G06K 9/00241 |
| | | | | 382/190 |

OTHER PUBLICATIONS

Shidu Dong et. al., "A Half Face Recognition Scheme" (SNPD, 2007, 2010 11th ACIS International Conference on Software Engineering, Artificial Intelligence, Networking and Parallel/Distributed Computing, 2010 11th ACIS International Conference on Software Engineering, Artificial Intelligence, Networking and Parallel/Distributed Computing 2007, pp. 355-358, doi:10.1109/SNPD.2007. 415).

(Continued)

*Primary Examiner* — Iman K Kholdebarin
(74) *Attorney, Agent, or Firm* — Canon U.S.A., Inc. IP Division

(57) ABSTRACT

One of the aspects of the present invention discloses an image processing apparatus and an image processing method. The image processing apparatus comprises: an image acquisition unit configured to acquire an image containing a face; a region location unit configured to locate at least one region which represents attributes of the face in the acquired image; a feature extraction unit configured to extract features from the located regions; and a feature integration unit configured to integrate the features of the located regions which are symmetrical with each other based on symmetry of the face. According to the present invention, the dimension of the features used for image processing could be reduced and the image processing accuracy could be maintained as much as possible.

14 Claims, 13 Drawing Sheets

(56) References Cited

OTHER PUBLICATIONS

Xuehan Xiong et.al., "Supervised descent method and its application to face alignment" (CVPR, 2013, 2013 IEEE Conference on Computer Vision and Pattern Recognition (CVPR), 2013 IEEE Conference on Computer Vision and Pattern Recognition (CVPR) 2013, pp. 532-539, doi:10.1109/CVPR.2013.75).

* cited by examiner

IMAGE PROCESSING APPARATUS AND IMAGE PROCESSING METHOD

CROSS-REFERENCE TO RELATED APPLICATIONS

The present application claims priority to Chinese Patent Application No. 201510784143.0, filed Nov. 16, 2015, entitled "IMAGE PROCESSING APPARATUS AND IMAGE PROCESSING METHOD", the content of which is expressly incorporated by reference herein in its entirety.

BACKGROUND OF THE INVENTION

Field of the Invention

The present invention relates to method and apparatus for image processing, and particularly relates to, for example, method and apparatus for facial expression recognition and face recognition.

Description of the Related Art

In recent years, facial expression recognition is popularly applied in the field of image processing, computer vision and pattern recognition. Generally, in a facial expression recognition system in which size of its storage device is not limited, facial expression features with high dimension will usually be extracted from input images and then will be used in the facial expression recognition, since the recognition accuracy always depends on the dimension of the used facial expression features (i.e. the higher dimension the used facial expression features have, the higher the recognition accuracy could be achieved). While, as for a facial expression recognition system in which the size of its storage device is limited, such as camera, digital camera, television camera, video camera, mobile phone, personal data assistant (PDA), or other suitable electronic device, there is a demand for using facial expression features with lower dimension while the recognition accuracy won't become worse.

One exemplary technique to recognize facial expression by using the facial expression features with low dimension is disclosed in "A Half Face Recognition Scheme" (Shidu Dong, Bo He, Qun Jiang, Huaqiu Wang, Tongyuan Huang, SNPD, 2007, 2010 11th ACIS International Conference on Software Engineering, Artificial Intelligence, Networking and Parallel/Distributed Computing, 2010 11th ACIS International Conference on Software Engineering, Artificial Intelligence, Networking and Parallel/Distributed Computing 2007, pp. 355-358, doi:10.1109/SNPD.2007.415). The above-mentioned technique mainly discloses the following operations: first, locating salient regions in the input image containing a face, wherein the salient regions could represent attributes of the face in the input image, such as the eye region, the nose region, the mouth region and so on; second, determining a half face with higher illumination in the input image, such as the rectangular block shown in FIG. 1A represents the left half face with higher illumination and the rectangular block shown in FIG. 1B represents the right half face with higher illumination; third, selecting the salient regions which are on the determined half face; and then, extracting facial expression features from the selected salient regions for facial expression recognition.

In the above-mentioned technique, the facial expression features are only extracted from the determined half face, thus the dimension of the facial expression features for facial expression recognition could be reduced. While, the half face used for extracting the facial expression features is determined by comparing the illuminations of two half faces of the input face, thus, the more obvious the illumination variance of the two half faces has, the more discriminative the half face used for extracting the facial expression features could be determined, and further the higher the recognition accuracy could be achieved.

In other words, if the illumination variance of the two half faces is not obvious (i.e., the input image has normal illumination), it would be difficult for the above-mentioned technique to determine the most discriminative half face. And since the above-mentioned technique only use the facial expression information of half of the face when recognizing the facial expression, the recognition accuracy would be worse compared with the recognition accuracy which is achieved by using the facial expression information of the whole face when recognizing facial expression. That is to say, as for the image with normal illumination, the above-mentioned technique would achieve worse recognition accuracy although the dimension of the facial expression features for facial expression recognition could be reduced.

SUMMARY OF THE INVENTION

Therefore, in view of the above recitations in Description of the Related Art, the present disclosure aims to solve the problems as described above.

According to one aspect of the present invention, there is provided an image processing apparatus, comprising: an image acquisition unit configured to acquire an image containing a face; a region location unit configured to locate at least one region which represents attributes of the face in the acquired image; a feature extraction unit configured to extract features from the located regions; and a feature integration unit configured to integrate the features of the located regions which are symmetrical with each other based on symmetry of the face.

Taking advantage of the present invention, the dimension of the features used for image processing could be reduced, and the image processing accuracy could be maintained.

Further characteristic features and advantages of the present invention will be apparent from the following description with reference to the drawings.

BRIEF DESCRIPTION OF THE DRAWINGS

The accompanying drawings, which are incorporated in and constitute a part of the specification, illustrate embodiments of the invention and, together with the description, serve to explain the principles of the invention.

DESCRIPTION OF THE EMBODIMENTS

Figure 1A:
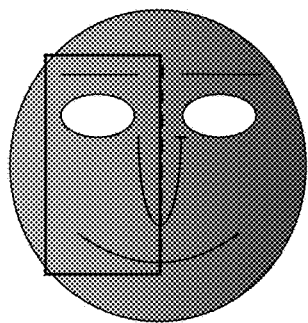
FIGS. 1A and 1B schematically shows human face images with illumination variances according to the prior art.

Exemplary embodiments of the present invention will be described in detail with reference to the drawings below. It shall be noted that the following description is merely illustrative and exemplary in nature, and is in no way intended to limit the present invention and its applications or uses. The relative arrangement of components and steps, numerical expressions and numerical values set forth in the embodiments do not limit the scope of the present invention unless it is otherwise specifically stated. In addition, techniques, methods and devices known by persons skilled in the art may not be discussed in detail, but are intended to be apart of the specification where appropriate.

Please note that similar reference numerals and letters refer to similar items in the figures, and thus once an item is defined in one figure, it need not be discussed for following figures.

Figure 2A:
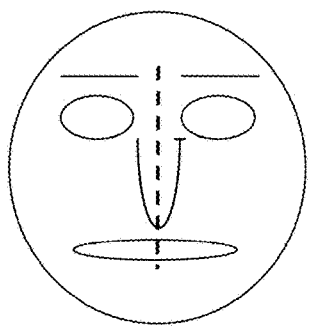
FIG. 2A to 2C schematically shows human face images each including a different facial expression.
Figure 2B:
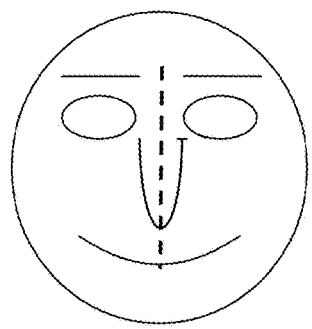
Figure 2C:
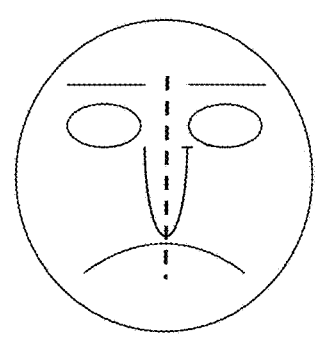

Statistics indicate that human face has symmetry. That is to say, the human face is almost left-right symmetrical, not only for the face with neutral expression (as shown in FIG. 2A), but also for the face with other expressions, such as smile expression (as shown in FIG. 2B), sadness expression (as shown in FIG. 2C) etc., wherein the dashed line shown in FIG. 2 is the symmetrical line of the face. Therefore, the inventors found that it was possible to utilize the symmetry of the face to reduce the dimension of the facial expression features when recognizing the facial expression. And simultaneously, the image processing accuracy could be maintained as much as possible.

(Hardware Configuration of the Image Processing Apparatus)

Figure 3:
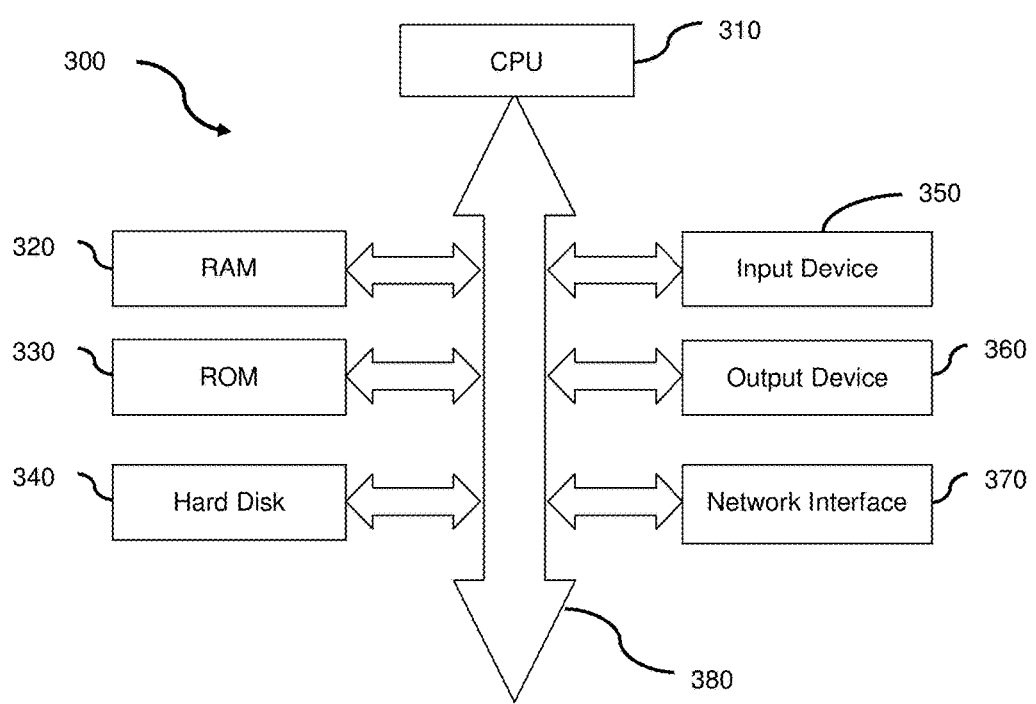
FIG. 3 is a block diagram schematically showing the hardware configuration of the image processing apparatus according to the embodiments of the present invention.

The hardware configuration of the image processing apparatus that can implement the techniques described hereinafter will be described first with reference to FIG. 3. FIG. 3 is a block diagram schematically showing the hardware configuration 300 of the image processing apparatus according to the embodiments of the present invention. The image processing apparatus according to the embodiments of the present invention is implemented by, such as personal computer (PC), camera, digital camera, television camera, video camera, mobile phone, personal data assistant (PDA) or other suitable electronic device.

The hardware configuration 300 of the image processing apparatus could include Central Processing Unit (CPU) 310, Random Access Memory (RAM) 320, Read Only Memory (ROM) 330, Hard Disk 340, Input Device 350, Output Device 360, Network Interface 370 and System Bus 380.

The CPU 310 could be any suitable programmable control device and could execute a variety of functions, to be described hereinafter, by executing a variety of application programs that are stored in the ROM 330 or the Hard Disk 340. The RAM 320 is used to temporarily store the program or the data that is loaded from the ROM 330 or the Hard Disk 340, and is also used as a space wherein the CPU 310 executes the variety of programs, such as carrying out the techniques which will be described in detail hereinafter by referring to FIGS. 4~21, as well as other functions performed by the image processing apparatus. The Hard Disk 340 could store many kinds of information, such as an operating system (OS), the various applications, a control program and the data pre-generated or set by the manufacture, wherein the data could be Thresholds (THs), facial expression models, face models which will be described hereinafter for example.

In one implementation, the Input Device 350 could be an input interface and could receive images which are output from an image acquiring device, such as the image acquiring device 1910 which will be described hereinafter by referring to FIG. 19. And the Output Device 360 could be an output interface and could output the processing results to the subsequence operations, such as recognizing the facial expression, recognizing the face, evaluating quality of the online education, or storing the captured image based on the recognized face in a digital camera, and all of these operations will be described hereinafter.

In another implementation, the Input Device 350 could allow the user to interact with the image processing apparatus, such as the user could input the images through the Input Device 350. And the Input Device 350 can take a variety of forms, such as a button, keypad, dial, a click wheel, or a touch screen. The Output Device 360 could include a Cathode Ray Tube (CRT) or a liquid crystal display, and could display the processing results to the user. In addition, the Input Device 350 and the Output Device 360 could be integrally incorporated, if the image processing apparatus is a so-called device such as intelligent mobile phone, PDA, tablet computer, or other suitable personal device. Furthermore, the Input Device 350 and the Output Device 360 could be discretely incorporated, if the image processing apparatus is a so-called device such as conventional mobile phone, laptop, desktop, or other suitable personal device.

The Network Interface 370 provides an interface for connecting the image processing apparatus to the network (not shown). For example, the image processing apparatus could perform, via the Network Interface 370, data communication with other electronic device (such as the image acquiring device 1910 and/or the monitoring device 1920 shown in FIG. 19) connected via the network. Alternatively, a wireless interface may be provided for the image processing apparatus to perform wireless data communication. The system bus 380 may provide a data transfer path for transferring data to, from, or between the CPU 310, the RAM 320, the ROM 330, the Hard Disk 340, the Input Device 350, the Output Device 360 and the Network Interface 370, and the like to each other. Although referred to as a bus, the system bus 380 is not limited to any specific data transfer technology.

Software that implements the same functions as the above described hardware devices could be used instead.

In an example of one embodiment of the present invention, such as image processing, the programs of this embodiment which will be described later by referring to FIGS. 9~10 and FIG. 16 could be installed in the Hard Disk 340 in advance and loaded from there to the RAM 320 when the CPU 310 needs to carry out the programs of this embodiment. In the other example, the programs of this embodiment could be recorded in the ROM 330 and directly executed by the CPU 310. In addition, the programs of other embodiments, such as facial expression recognizing and face recognizing, which will be described later by referring to FIG. 18 and FIG. 21 could also be stored and executed in the same manner.

The above described hardware configuration 300 of the image processing apparatus shown in FIG. 3 is merely illustrative and is in no way intended to limit the invention, its application, or uses. And for the sake of simplicity, only one hardware configuration is shown in FIG. 3. However, a plurality of hardware configurations can also be used as needed.

(Configuration of the Image Processing Apparatus)

Figure 4:
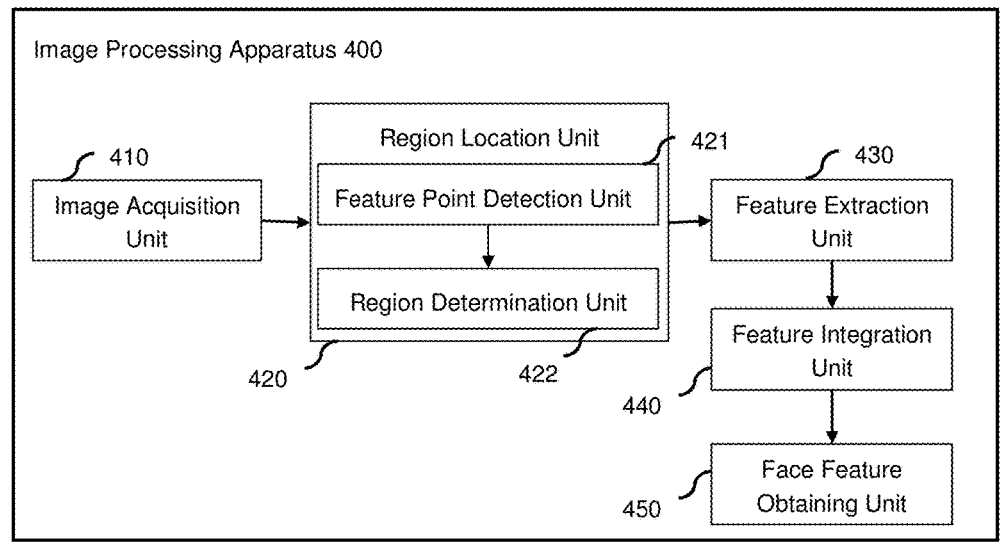
FIG. 4 is a block diagram illustrating the configuration of image processing apparatus according to the first embodiment of the present invention.

The configuration for image processing by the above described image processing apparatus will be described next with reference to FIG. 4. FIG. 4 is a block diagram illustrating the configuration of image processing apparatus 400 according to the first embodiment of the present invention.

Blocks shown in FIG. 4 are implemented as the CPU 310 of the image processing apparatus that is described above with reference of FIG. 3 and used for executing programs loaded to the RAM 320 and for cooperating with each of the hardware shown in FIG. 3. Some or all of the blocks could be implemented by dedicated hardware.

As shown in FIG. 4, the image processing apparatus 400 according to the first embodiment of the present invention comprises: an image acquisition unit 410, a region location unit 420, a feature extraction unit 430 and a feature integration unit 440. And the image processing apparatus 400 could further comprise a face feature obtaining unit 450.

As described above, first, the Input Device 350 shown in FIG. 3 would receive one image containing a face (such as the human face image shown in FIG. 2A) which is output from the image acquiring device or is input by the user. Second, the Input Device 350 would transfer the acquired image to the image acquisition unit 410 via the system bus 380.

And then, as shown in FIG. 4, first, the image acquisition unit 410 would acquire the image containing the face from the Input Device 350 through the system bus 380.

Second, the region location unit 420 would locate at least one region which represents attributes of the face in the acquired image. In one implementation, the attributes could be expression attributes of the face as for facial expression recognition. In another implementation, the attributes could also be texture attributes of the face as for face recognition. In addition, the regions which represent attributes of the face could also be regarded as salient regions at present invention, and the eye region, the nose region, the mouth region and other regions in the face could be regarded as the above-mentioned salient regions. Hereinafter, the salient regions will be used to represent the regions which represent attributes of the face.

The region location unit 420 could locate only one salient region which contains two eye regions, one nose region and one mouth region simultaneously. Further, the region location unit 420 could also locate more than one salient region. In one instance, the region location unit 420 could locate two salient regions, such as one salient region contains two eye regions, and the other contains the nose region and the mouth region. In another instance, the region location unit 420 could locate three salient regions, such as the first salient region contains two eye regions, the second salient region contains the nose region, and the third salient region contains the mouth region.

In order to obtain more accurate salient region, so that the feature extraction unit 430 and the feature integration unit 440 which will be described hereinafter could obtain more accurate features, as a preferable solution, the region location unit 420 could comprise a feature point detection unit 421 and a region determination unit 422, as shown in FIG. 4.

First, the feature point detection unit 421 could detect feature points in the acquired image. Many existed methods could be used for detecting the feature points, such as the commonly used active appearance model (AAM) method. In one implementation, the method disclosed in "Supervised descent method and its application to face alignment" (Xuehan Xiong, Fernando De la Torre, CVPR, 2013, 2013 IEEE Conference on Computer Vision and Pattern Recognition (CVPR), 2013 IEEE Conference on Computer Vision and Pattern Recognition (CVPR) 2013, pp. 532-539, doi: 10.1109/CVPR.2013.75) could be used in the feature point detection unit 421 to detect feature points.

Figures 5A, 5B, 5C:
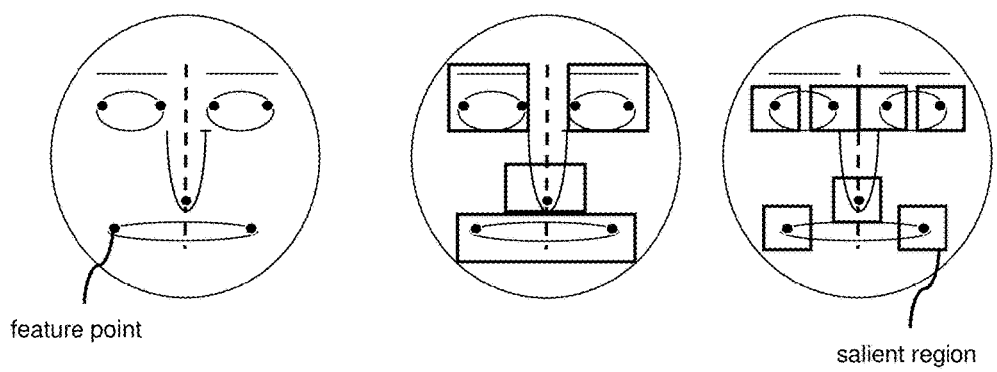
FIG. 5A to 5C schematically shows an example for the detected feature points and the corresponding located salient regions.

At present invention, the number of the detected feature points is not fixed. Generally speaking, the eye region, the nose region and the mouth region could contain much more attributes of the face, thus the feature points are often detected from this kind of regions. In one implementation, seven feature points could be detected in the acquired image, wherein the seven feature points includes two feature points on each eye region, one feature point on the nose region, and two feature points on the mouth region. And the black points shown in FIG. 5A are the exemplary detected feature points. In another implementation, in order to obtain more attributes of the face for the subsequence operations, fifteen feature points could be detected in the acquired image, wherein the fifteen feature points includes four feature points on each eye region, three feature points on the nose region, and four feature points on the mouth region. And the black points shown in FIG. 6A are the exemplary detected feature points.

After the feature point detection unit 421 detected the feature points in the acquired image, the region determination unit 422 would determine the salient regions based on the detected feature points. The salient regions can be in any shape, such as, rectangle, square, etc, and can be in any size depending on the manufacture's settings. In addition, the number of the salient regions is not fixed and could also be decided based on the manufacture's settings.

As for the detected feature points shown in FIG. 5A, in one instance, the region determination unit 422 could locate four salient regions, wherein the four salient regions includes two eye regions, one nose region and one mouth region, as shown in FIG. 5B. In another instance, in order to obtain more attributes of the face for the subsequence operations, the region determination unit 422 could also locate seven salient regions, as shown in FIG. 5C. In this instance, each located salient region shown in FIG. 5C could be centred on one detected feature point for example. And both width and length of each located salient region could be set as 20%~45% of the length of the acquired image if the located salient region is a square. Or, the width and length of each located salient region could respectively be set as 20%~45% of the width and length of the acquired image if the located salient region is a rectangle.

Figure 6A:
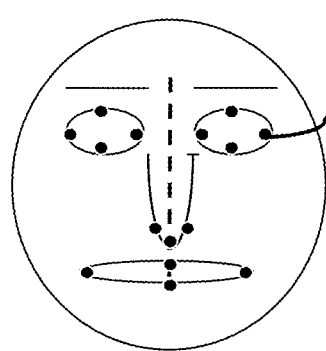
FIGS. 6A and 6B schematically shows another example for the detected feature points and the corresponding located salient regions.
Figure 6B:
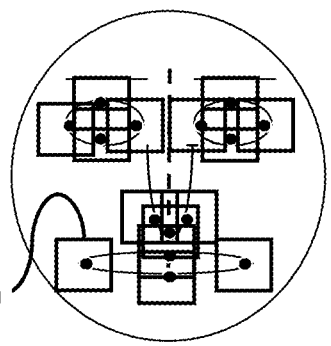

As for the detected feature points shown in FIG. 6A, in one instance, the region determination unit 422 could locate fifteen salient regions, as shown in FIG. 6B. And the method for locating each salient region shown in FIG. 6B is same as the above-mentioned method for locating each salient region shown in FIG. 5C. Taking the acquired image with the size of 200*200 pixels for example, each located salient region could be centred on one detected feature point and could have the size of 60*60 pixels.

Now goes back to FIG. 4, after the region location unit 420 located the above-mentioned salient regions in the acquired image, the feature extraction unit 430 would extract features from the located salient regions. For example, as described above, as for the facial expression recognition, the extracted features corresponding to the attributes of the face could be expression features; and as for face recognition, the extracted features corresponding to the attributes of the face could be texture features.

In order to obtain more accurate features, so that the feature integration unit 440 which will be described hereinafter could obtain more accurate integrated features, as a preferable solution, as for each of the located salient region, the feature extraction unit 430 first would divide the located salient region into a plurality of blocks with same size of area, wherein the size of area of the blocks and the number of the blocks can be different according to the size of located salient region. In order to facilitate the integration operation of the feature integration unit 440 which will be described hereinafter, the number of the blocks could be the even number. As described above, taking the located salient region with the size of 60*60 pixels for example, the division mode of the located salient region could be 4-by-4 mode, that is to say, both of the width and height of each block are 15 pixels, which means each salient region is divided into 16 blocks with the same size of area.

Figure 7A:
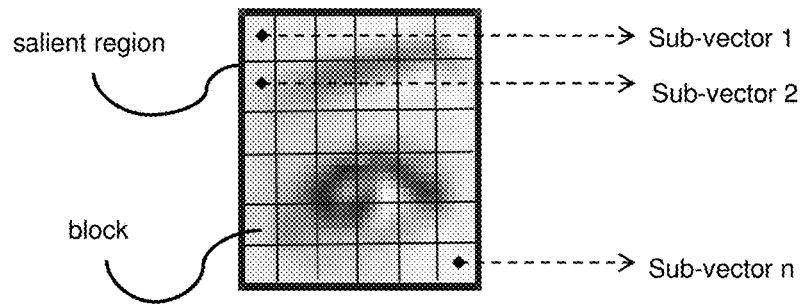
FIGS. 7A and 7B schematically shows an example for the divided blocks of one located salient region related to the eye and the extracted features from the divided blocks.
Figure 7B:
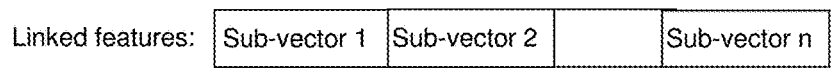

Second, the feature extraction unit 430 would extract features from each of the divided blocks. Many image feature descriptors can be used in the feature extraction unit 430 to extract the features from the divided blocks, such as Scale-invariant Feature Transform (SIFT), Speeded Up Robust Features (SURF), Local Binary Pattern (LBP) and so on. FIG. 7A schematically shows an example for the divided blocks of one located salient region related to the eye and the extracted features from the divided blocks, wherein 'Sub-vector n' shown in FIG. 7A represents the features extracted from the Nth block.

In addition, the feature extraction unit 430 could also link the features extracted from the divided blocks together to construct one linked feature for the salient region. The linking order for the features is not limited as long as each of the salient regions has the same linking order for the features. In one instance, the linking order for the features in one salient region could be linking the features extracted from the upper block to the bottom block and from the left block to the right block, such as the linked feature shown in FIG. 7B.

Now goes back to FIG. 4, after the feature extraction unit 430 extracted the features from the located salient regions, wherein as for one located salient region, the feature could be the above-mentioned linked feature of the salient region, the above-mentioned features extracted from each of the divided blocks, or the feature directly extracted from the salient region, in order to reduce the dimension of the features, the feature integration unit 440 would integrate the features of the located salient regions which are symmetrical with each other based on the symmetry of the face, wherein if two located salient regions are symmetrical with each other based on the symmetry of the face, that means centers of this two located salient regions are symmetrical with each other based on the symmetry of the face. The detailed processing will be described hereinafter with reference to FIGS. 9~15.

Furthermore, after the feature integration unit 440 integrates the features of the located salient regions based on the symmetry of the face, the face feature obtaining unit 450 could further link the integrated features together to obtain a linked feature for the whole face; and the linking order is not limited as long as the linking order for each face image is the same.

Finally, the face feature obtaining unit 450 would transfer the linked feature for the whole face to the Output Device 360 shown in FIG. 3 via the system bus 380 for displaying the processing results to the user or for the subsequence operations which will be described hereinafter, such as recognizing the facial expression, recognizing the face and so on.

(Detailed Configuration and Processing of the Feature Integration)

Figure 8:
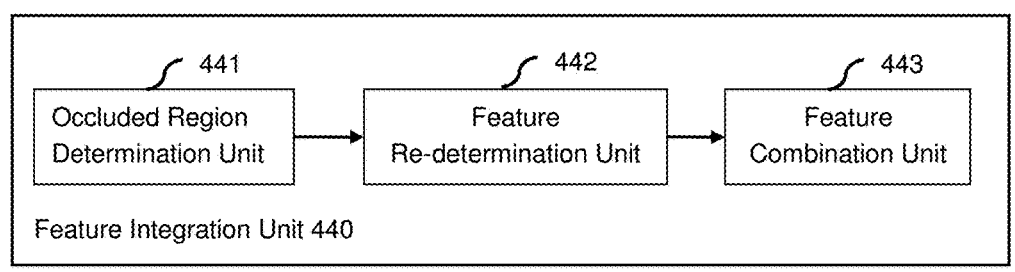
FIG. 8 is a block diagram illustrating the detailed configuration of the feature integration unit 440 shown in FIG. 4 of the present invention.

FIG. 8 shows a block diagram illustrating the detailed configuration of the feature integration unit 440 shown in FIG. 4. As shown in FIG. 8, first, the feature integration unit 440 comprises a feature combination unit 443. As for one located salient region, the feature combination unit 443 first would judge whether the center (i.e. the detected feature point, if the located salient region is centred on the detected feature point as described above) of the located salient region is on the symmetrical line of the face or not. And then, if the center of the located salient region is judged not on the symmetrical line of the face, the feature combination unit 443 would combine the features of the located salient region with the features of the symmetrical region of this located salient region. And if the center of the located salient region is judged on the symmetrical line of the face, the feature combination unit 443 would combine the features of first sub-region (such as the left sub-region) of the located salient region with the features of second sub-region (such as the right sub-region) of the located salient region, wherein the located region is divided into the first sub-region and the second sub-region by the symmetrical line of the face. The detailed processing will be described hereinafter with reference to FIG. 9.

In daily life, the human face is often occluded by other objects, such as part of the forehead is often occluded by the hair, part of the eyes is often occluded by the glasses and so on. Since the features extracted from the regions which are occluded by the other objects would cause certain noise which would influence the accuracy of the extracted features, in order to reduce the influence caused by the occlusion when integrating the features and in order to obtain more accuracy integrated features, the feature integration unit 440 could further comprise an occluded region determination unit 441 and a feature re-determination unit 442, as shown in FIG. 8. First, as for one located salient region, the occluded region determination unit 441 will determine whether the located salient region is an occluded region or not, wherein the occluded region could be a salient region occluded by the hair or a salient region occluded by the glasses for example. Second, as for one occluded region, the feature re-determination unit 442 will re-determine the features of the occluded region according to the features of the corresponding located salient region which are symmetrical with the occluded region based on the symmetry of the face. The detailed integration processing will be described hereinafter with reference to FIG. 9.

Figure 9:
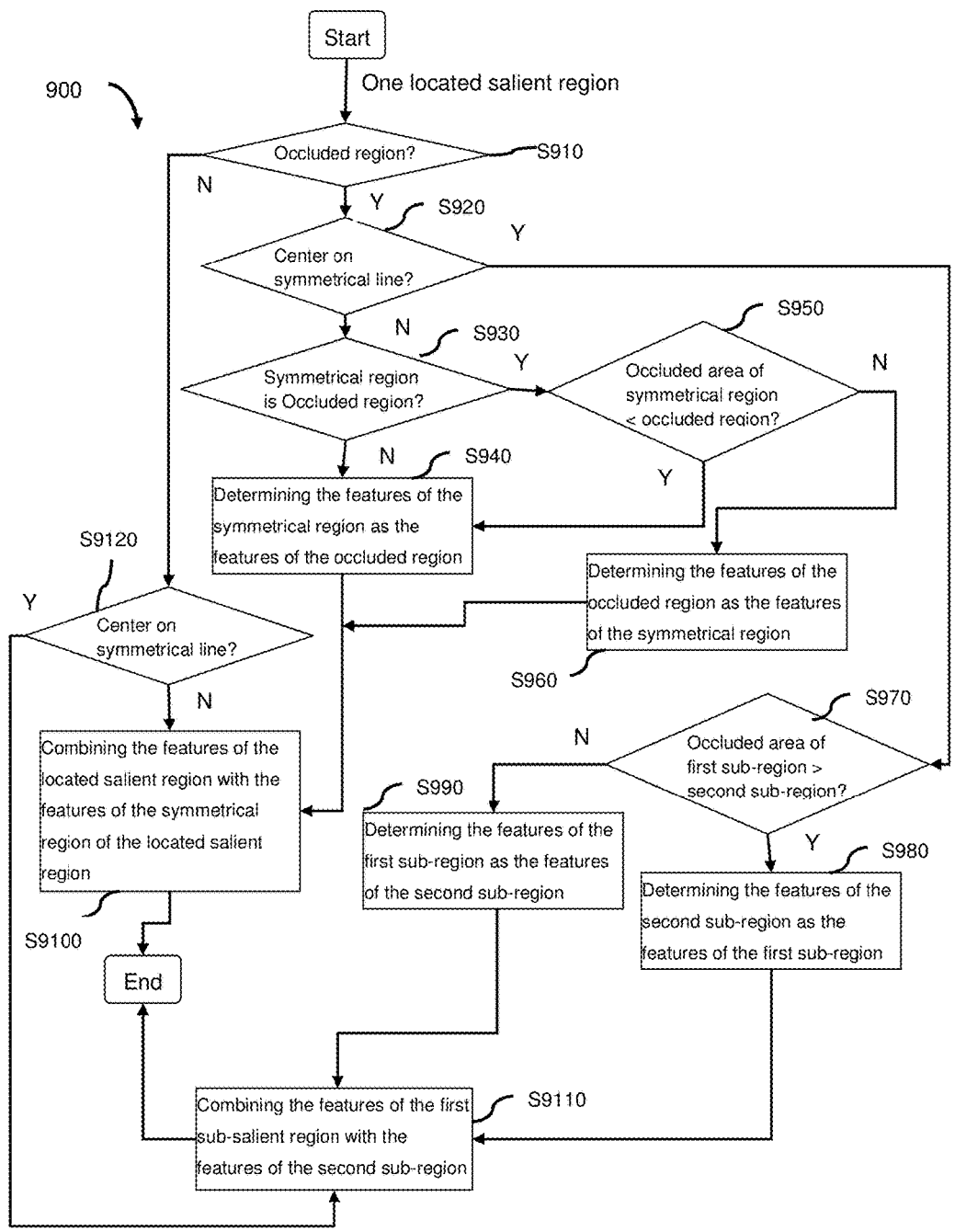
FIG. 9 is a flowchart schematically showing a detailed procedure of processing of the feature integration unit 440 shown in FIG. 8.

FIG. 9 is a flowchart 900 schematically showing a detailed procedure of processing of the feature integration unit 440 shown in FIG. 8. As for one located salient region, as shown in FIG. 9, in step S910, the occluded region determination unit 441 shown in FIG. 8 will determine whether the located salient region is an occluded region or not. As a preferable solution, the occluded region determination unit 441 could determine whether the located salient region is the occluded region or not based on black pixel density of the located salient region, and the detailed processing will be described hereinafter with reference to FIG. 10, FIG. 11, and FIGS. 12A and 12B. In addition, except based on the black pixel density, the occluded region determination unit 441 could also use other existed methods to judge whether the located salient region is the occluded region or not, such as the method based on fuzzy principal component analysis, the method based on B-spline active contour and skin color information, or the GraphCut-based Detection method.

Figure 10:
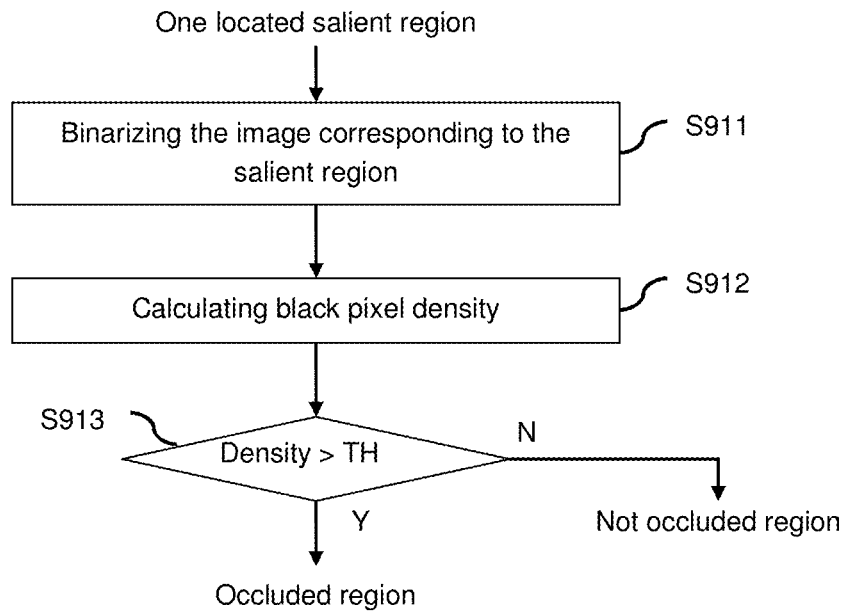
FIG. 10 is a flowchart schematically showing a detailed procedure of processing of the step S910 shown in FIG. 9.
Figure 11:
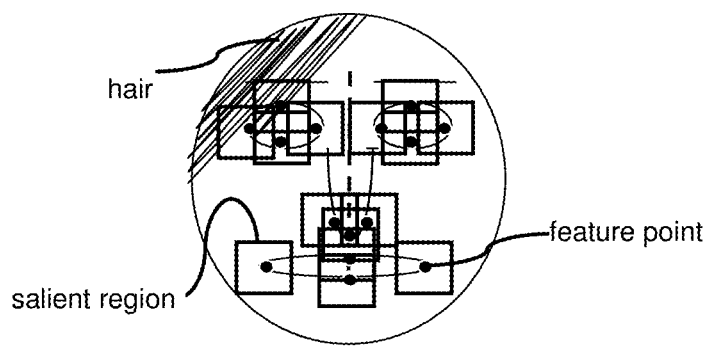
FIG. 11 schematically shows a human face part of which is occluded by the hair.

FIG. 10 is a flowchart schematically showing a detailed procedure of processing of the step S910 shown in FIG. 9. As shown in FIG. 10, in step S911, the occluded region determination unit 441 will binarize the image corresponding to the located salient region (such as one of the located salient regions shown in FIG. 11, wherein part of the human face shown in FIG. 11 is occluded by the hair) by using the existed binary algorithms, such as the OSTU algorithm, the adaptive thresholding algorithm, thresholding algorithm and so on. In step S912, the occluded region determination unit 441 will calculate the black pixel density of the located salient region by using the following function:

$$\alpha = \frac{\text{the total number of black pixels in the located salient region}}{\text{the size of the located salient region}}$$

wherein α represents the black pixel density.

And then, in step S913, the occluded region determination unit 441 will judge whether the black pixel density of the located salient region is larger than a predetermined threshold (TH) or not, wherein the TH could be set by the manufacture. If the black pixel density is larger than the TH, the located salient region will be judged as an occluded region; otherwise, the located salient region is not an occluded region.

As described above, the occluded region determination unit 441 needs to calculate each located salient region's black pixel density. While, generally, only the eye regions are more often occluded by the hair, such as the human face shown in FIG. 11, and other parts of the human face are rarely occluded by other objects. Thus, in order to simplify the calculation, as a preferable solution, the occluded region determination unit 441 could only judge whether the eye regions (such as the left eye region and the right eye region shown in FIG. 12A) are occluded or not. And if one of the eye regions (such as the left eye region shown in FIG. 12A) is judged as an occluded region, the feature re-determination unit 442 shown in FIG. 8 could directly determine the extracted features related to the right eye region as the features related to the left eye region. And if both of the eye regions are judged as the occluded regions, the feature re-determination unit 442 shown in FIG. 8 could re-determine the features related to the left eye region or the features related to the right eye region based on size of occluded area of the left eye region and the right eye region. That is to say, the feature re-determination unit 442 would determine the features related to the right eye region as the features related to the left eye region if the size of occluded area of the left eye region is larger than that of the right eye region; otherwise, would determine the features related to the left eye region as the features of related to the right eye region.

Figure 12A:
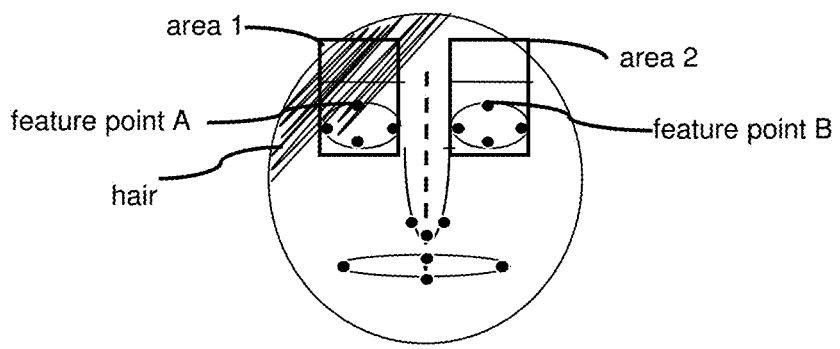
FIGS. 12A and 12B is a drawing schematically showing the judgement about whether the left and right eye regions are occluded or not.
Figure 12B:
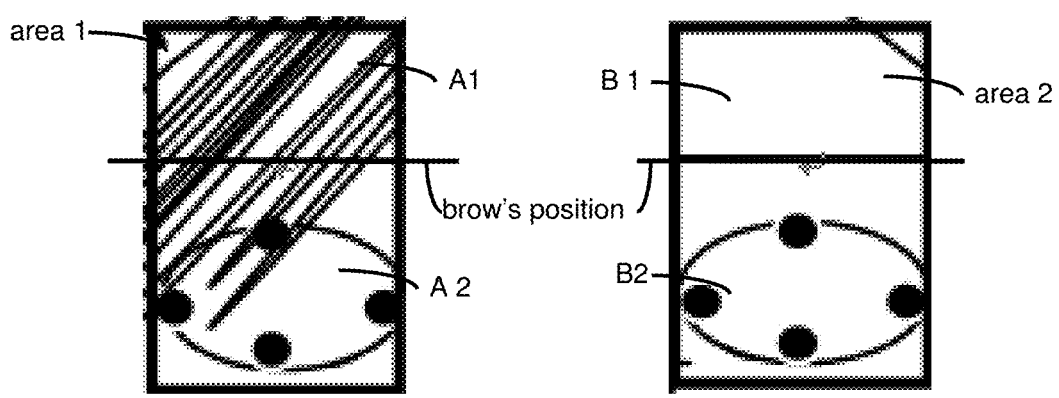

As an instance, a drawing schematically showing the judgement about whether the left and right eye regions are occluded or not is shown in FIGS. 12A and 12B. As shown in FIG. 12A, first, the occluded region determination unit 441 will determine area 1 which covers the left eye region and the left brow and area 2 which covers the right eye region and the right brow. As long as the determined area could cover the eye region and the brow, the determined area can be in any shape, such as, rectangle, square, etc, and can be in any size. Taking the area 1 for example, as a preferable solution, first, according to the 4 feature points of the left eye detected by the feature point detection unit 421, the occluded region determination unit 441 could calculated the left eye's height and the left eye's width. Second, the occluded region determination unit 441 could estimate the left brow's position according to the calculated left eye's height and position of the feature point A. Generally, the distance from the feature point A to the brow equals the eye's height. And then, the occluded region determination unit 441 could determine the area 1 based on the left eye's width and the left brow's position.

Then, as shown in FIG. 12B, the area 1 could be divided into two parts, i.e. A1 and A2, in the brow's position, and the area 2 also could be divided into two parts, i.e. B1 and B2. As described above, the occluded region determination unit 441 will binarize the images corresponding to each part and calculate each part's black pixel density by using the following functions:

$$\alpha_{A1} = \frac{\text{the total number of black pixels in } A1}{\text{the size of } A1},$$

$$\alpha_{A2} = \frac{\text{the total number of black pixels in } A2}{\text{the size of } A2},$$

-continued $$\alpha_{B1} = \frac{\text{the total number of black pixels in } B1}{\text{the size of } B1},$$

$$\alpha_{B2} = \frac{\text{the total number of black pixels in } B2}{\text{the size of } B2}.$$

wherein αA1, αA2, αB1, αB2 respectively represent A1's black pixel density, A2's black pixel density, B1's black pixel density and B2's black pixel density.

Finally, the occluded region determination unit 441 will judge whether the black pixel density of the each part is larger than a corresponding predetermined threshold (TH1 and TH2) or not, wherein the TH1 and TH2 could be set by the manufacture, and the TH1 and TH2 could be in the range of 0.65~0.8 for example. As for the one eye region, if both of the parts' black pixel density is larger than the corresponding TH, the eye region will be judged as an occluded region; otherwise, the eye region is not an occluded region. As shown in FIG. 12B, since the occluded region determination unit 441 judges that the black pixel density of A1 is larger than TH1 and the black pixel density of A2 is larger than TH2, thus the left eye region will be judged as an occluded region. In addition, since the occluded region determination unit 441 judges that the black pixel density of B1 is less than TH1 and the black pixel density of B2 is less than TH2, thus the right eye region is not an occluded region.

Now goes back to FIG. 9, in step S910, if the occluded region determination unit 441 determines that the located salient region is an occluded region, the procedure will go to step S920; otherwise, the procedure will go to step S9120.

In step S920, the feature re-determination unit 442 would judge whether the center of the occluded region is on the symmetrical line of the face or not. If the center of the occluded region is judged not on the symmetrical line of the face, the procedure will go to step S930; otherwise, the procedure will go to step S970.

In step S930, the feature re-determination unit 442 would judge whether the symmetrical region of the occluded region is an occluded region or not, and the corresponding judgement is similar to the judgement of step S910 as described above. If the symmetrical region of the occluded region is judged as an occluded region, the procedure will go to step S950; otherwise, the procedure will go to step S940.

In step S940, the feature re-determination unit 442 would determine the features of the symmetrical region as the features of the occluded region.

In step S950, the feature re-determination unit 442 would judge whether size of occluded area of the symmetrical region is less than size of occluded area of the occluded region or not. And, if the size of occluded area of the symmetrical region is less than the size of occluded area of the occluded region, the feature re-determination unit 442 would determine the features of the symmetrical region as the features of the occluded region as described in step S940. Otherwise, in step S960, the feature re-determination unit 442 would determine the features of the occluded region as the features of the symmetrical region. In addition, if the size of occluded area of the symmetrical region is equal to the size of occluded area of the occluded region, the feature re-determination unit 442 also could not re-determine the features of the occluded region and the features of the symmetrical region.

As described above in step S920, if the center of the occluded region is judged on the symmetrical line of the face, in step S970, the feature re-determination unit 442 would judge whether size of occluded area of the first sub-region (such as the left sub-region) of the occluded region is larger than size of occluded area of the second sub-region (such as the right sub-region) of the occluded region or not. And if the size of occluded area of the first sub-region is larger than size of occluded area of the second sub-region, in step S980, the feature re-determination unit 442 would determine the features of the second sub-region as the features of the first sub-region; otherwise, in step S990, the feature re-determination unit 442 would determine the features of the first sub-region as the features of the second sub-region. In addition, if the size of occluded area of the first sub-region is equal to the size of occluded area of the second sub-region, the feature re-determination unit 442 also could not re-determine the features of the first sub-region and the features of the second sub-region.

As described above, the main operation of the steps S920~S990 is that: the feature re-determination unit 442 would re-determine the features of the occluded region or the features of the symmetrical region of the occluded region based on size of occluded area of the occluded region and size of occluded area of the symmetrical region, if the center of the occluded region is not on the symmetrical line of the face; and the feature re-determination unit 442 would re-determine the features of the first sub-region or the second sub-region of the occluded region based on size of occluded area of the first sub-region and size of occluded area of the second sub-region, if the center of the occluded region is on the symmetrical line of the face.

Now goes back to FIG. 9, after the feature re-determination unit 442 re-determines the features of the occluded region according to the above-mentioned steps S930~S960, in step S9100, the feature combination unit 443 shown in FIG. 8 would combine the features of the located salient region with the features of the symmetrical region of this located salient region. And after the feature re-determination unit 442 re-determines the features of the occluded region according to the above-mentioned steps S970~S990, in step S9110, the feature combination unit 443 would combine the features of first sub-region of the located salient region with the features of second sub-region of the located salient region.

As described in step S910, if the occluded region determination unit 441 determines that the located salient region is not an occluded region, the procedure will go to step S9120. In step S9120, the feature combination unit 443 would judge whether the center of the located salient region is on the symmetrical line of the face or not. If the center of the located salient region is judged not on the symmetrical line of the face, the procedure will go to the above-mentioned step S9100; otherwise, the procedure will go to the above-mentioned step S9110.

In step S9100, due to the symmetry of the face, the divided blocks in the located salient region and the divided blocks in its symmetrical region would have different positions. Thus the feature combination unit 443 would first make the divided blocks in the located salient region and the divided blocks in its symmetrical region have the same positions based on the symmetry of the face and then would fuse the features of the located salient region and the features of its symmetrical region, wherein the fusing operation could be a kind of arithmetical operations, such as add operation, multiply operation, averaging operator and so on. The exemplary processing will be described hereinafter with reference to FIG. 13A to 13D.

Figure 13A:
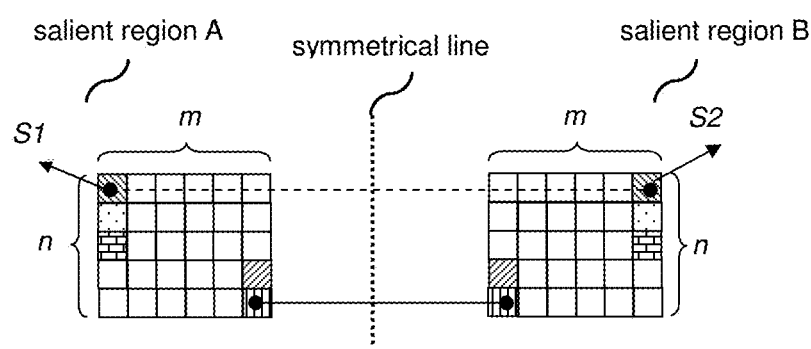
FIG. 13A to 13D is a drawing schematically showing two located salient regions which are symmetrical with each other based on the symmetry of the face and the corresponding features extracted from them.
Figure 13B:
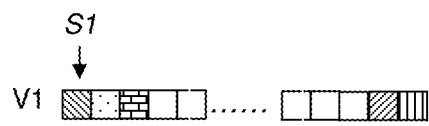
Figure 13C:

FIG. 13A to 13D is a drawing schematically showing two located salient regions which are symmetrical with each other based on the symmetry of the face and the corresponding features extracted from them. One located salient region (i.e. salient region A) and the other located salient region (i.e. salient region B) are shown in FIG. 13A, wherein these two salient regions are symmetrical with each other based on the symmetry of the face (i.e. the dashed line shown in FIG. 13A). As an example, both of the two salient regions are divided into same number of blocks (such as m*n shown in FIG. 13A) and each block has same size of area. One block which is on the top left corner of the salient region A is S1 and the other block which is on the top right corner of the salient region B is S2. Obviously, the block S1 is symmetrical with the block S2.

As described above, the feature extraction unit 430 shown in FIG. 4 could link the features extracted from the divided blocks together to construct a linked feature for a salient region, and the linking order for the features for each of the salient regions are the same. Assuming the linking order for the features is that linking the features extracted from the upper block to the bottom block and from the left block to the right block, thereby, the feature of the block S1 is first linked to construct the linked feature for the salient region A (such as the linked feature V1 shown in FIG. 13B), while the feature of the block S2 is not first linked when constructing the linked feature for the salient region B (such as the linked feature V2 shown in FIG. 13C). That means the position of the block S1 is different from the position of the block S2.

Figure 13D:
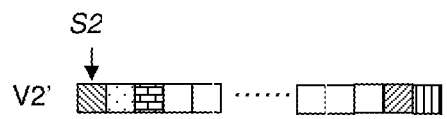

Therefore, some adjustments should be preformed. Taking the salient region A as a reference (i.e. each block's position in the salient region A is unchanged), each block's position in the salient region B needs to be transformed. As shown in FIG. 13D, the linked feature V2 would be transformed into the linked feature V2' by adjusting the index of each block based on the symmetry of the face (such as the linking order for the features is that linking the features extracted from the upper block to the bottom block and from the right block to the left block), so that the divided blocks in the salient region A and the divided blocks in the salient region B could have the same positions.

Now goes back to FIG. 9, in step S9110, due to the symmetry of the face, the divided blocks in the first sub-region and the divided blocks in the second sub-region would have different positions. Thus the feature combination unit 443 would first make the divided blocks in the first sub-region and the divided blocks in the second sub-region have the same positions based on the symmetry of the face and then would fuse the features of the first sub-region and the features of the second sub-region, wherein the fusing operation could be the above-mentioned arithmetical operations, such as add operation, multiply operation, averaging operator and so on. The exemplary processing will be described hereinafter with reference to FIG. 14A to 14D.

Figure 14A:
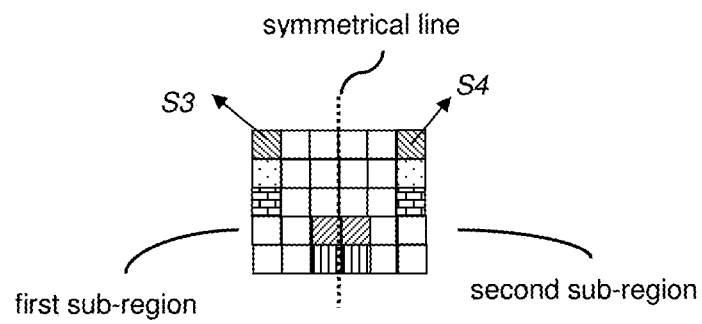
FIG. 14A to 14D is a drawing schematically showing a located salient region which is divided into two parts by the symmetry of the face and the corresponding features extracted from these two parts.

FIG. 14A to 14D is a drawing schematically showing a located salient region which is divided into two parts by the symmetry of the face and the corresponding features extracted from these two parts. One located salient region which is divided by the symmetry of the face (i.e. the dashed line) is shown in FIG. 14A, wherein the left sub-region of this located salient region is the first sub-region and the right sub-region of this located salient region is the second sub-region.

Figure 14B:
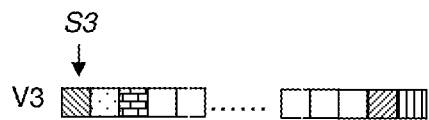
Figure 14C:
Figure 14D:
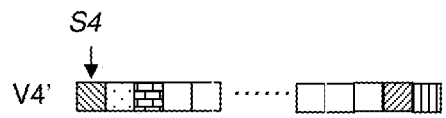
Figure 15:
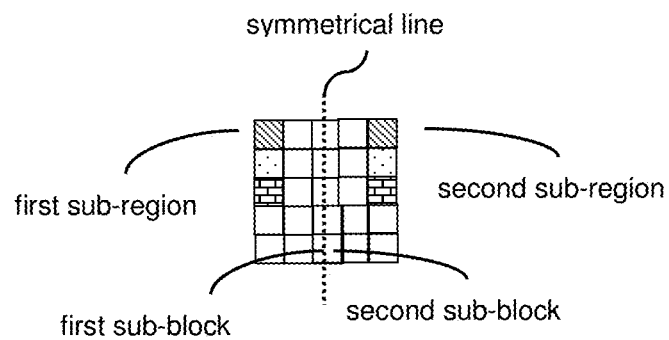
FIG. 15 schematically shows the case that some blocks of a located salient region are divided into two parts by the symmetrical line of the face.

Same as the description in FIG. 13A to 13D, the block S3 is symmetrical with the block S4, and the position of the block S3 is different from the position of the block S4. Therefore, taking the first sub-region as a reference, each block's position in the second sub-region needs to be transformed. As shown in FIG. 14B to 14D, the linked feature V3 for the first sub-region is shown in FIG. 14B, the linked feature V4 for the second sub-region is shown in FIG. 14C, and the transformed linked feature V4' for the second sub-region is shown in FIG. 14D. Thereby, the divided blocks in the first sub-region and the divided blocks in the second sub-region could have the same positions.

In addition, as for a salient region, the number of the blocks is generally the even number as described above, thus the case that the symmetrical line of the face divides some blocks into two parts generally doesn't exist. While, if the number of the blocks is an odd number, the symmetrical line of the face would divide some blocks into two parts, such as the case shown in FIG. 15. In such a case, as for each block which is divided into two parts (such as the first sub-block and the second sub-block shown in FIG. 15) by the symmetrical line of the face, first the feature extraction unit 430 shown in FIG. 4 would re-extract features from each sub-blocks, and then the feature combination unit 443 shown in FIG. 8 would execute the corresponding processing described in step S9110.

As described, since the present invention utilizes the symmetry of the face to determine pairs of the salient regions which are symmetrical with each other and integrates the extracted features of each pair of the salient regions into one feature, the dimension of the features used for image processing could be reduced.

Taking the human face shown in FIGS. 6A and 6B for example, as described above, the region determination unit 422 shown in FIG. 4 locates fifteen salient regions, and the fifteen salient regions are four salient regions on each eye region, three salient regions on the nose region, and four salient regions on the mouth region respectively. And then, the feature extraction unit 430 would construct one linked feature for each located salient region, that is to say, the feature extraction unit 430 would construct fifteen linked features. According to the present invention, the feature integration unit 440 could find six pairs of the salient regions which are symmetrical with each other and three salient regions which are on the symmetrical line of the face. Thus, the feature integration unit 440 would integrate the fifteen linked features into nine integrated features, and the nine integrated features are four integrated features for the two eye regions, two integrated features for the nose region, and three integrated features for the mouth region respectively. Therefore, the dimension of the feature for the human face shown in FIGS. 6A and 6B used for image processing could be reduced.

In addition, since the present invention extracts features from the whole face contained in the input image and takes the occlusion into consideration, the image processing accuracy could be maintained.

(Overall Processing)

Overall processing executed by the configuration of the first embodiment will be described with reference to FIG. 16. FIG. 16 is a flowchart 1600 schematically showing the procedure of overall processing according to the first embodiment.

As described above, first, the Input Device 350 shown in FIG. 3 would receive one image containing a face which is output from the image acquiring device or is input by the user. Second, the Input Device 350 would transfer the acquired image to the image acquisition unit 410 shown in FIG. 4 via the system bus 380.

Figure 16:
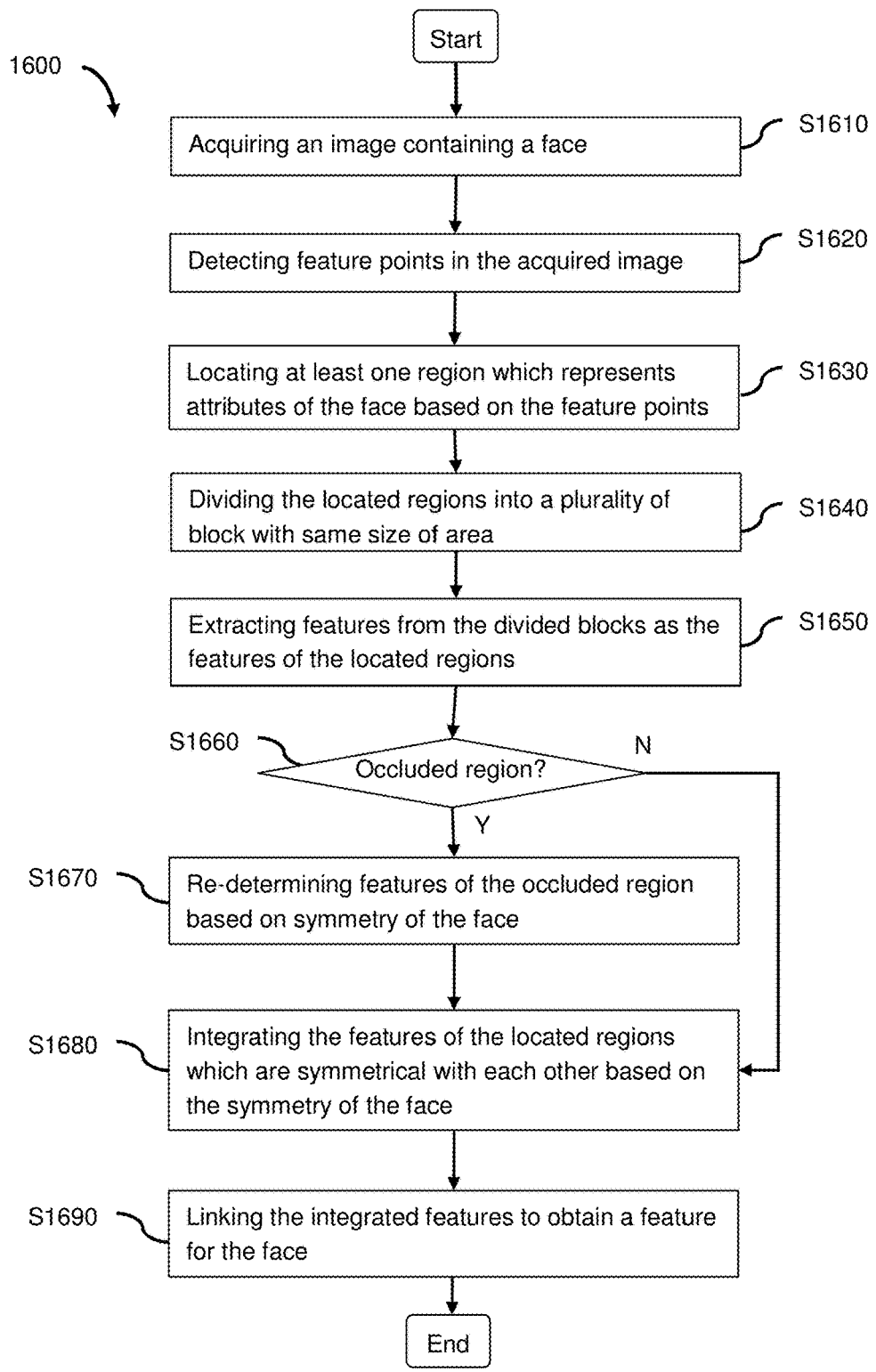
FIG. 16 is a flowchart schematically showing the procedure of overall processing according to the first embodiment.

And then, as shown in FIG. 16, in image acquisition step S1610, the image acquisition unit 410 would acquire the image containing the face from the Input Device 350 through the system bus 380.

In feature point detection step S1620, the region location unit 420 would detect feature points in the acquired image by using the existed methods.

In region location step S1630, the region location unit 420 would locate at least one region which represents attributes of the face in the acquired image. At present invention, the regions which represent attributes of the face could be regarded as salient regions, and the eye region, the nose region, the mouth region and other regions in the face could be regarded as the above-mentioned salient regions.

In block dividing step S1640, the feature extraction unit 430 would divide the located salient region into a plurality of blocks with same size of area. In order to facilitate the integration operation of the feature integration unit 440, the number of the blocks could be the even number.

In feature extraction step S1650, the feature extraction unit 430 would extract features from each divided blocks.

In occluded region determination step S1660, as for each located salient region, the feature integration unit 440 would determine whether the located salient region is an occluded region or not, wherein the occluded region could be a salient region occluded by the hair or a salient region occluded by the glasses for example. If the located salient region is judged as an occluded region, the procedure will go to step S1670; otherwise, the procedure will go to step S1680.

In feature re-determination step S1670, as for one occluded region, the feature integration unit 440 would re-determine the features of the occluded region according to the features of the corresponding located salient region which are symmetrical with the occluded region based on the symmetry of the face.

In feature integration step S1680, the feature integration unit 440 would integrate the features of the located salient regions which are symmetrical with each other based on the symmetry of the face, wherein if two located salient regions are symmetrical with each other based on the symmetry of the face, that means centers of this two located salient regions are symmetrical with each other based on the symmetry of the face.

In face feature obtaining step S1690, the face feature obtaining unit 450 could further link the integrated features together to obtain a linked feature for the whole face, wherein the linking order is not limited as long as the linking order for each face image is the same.

And finally, the face feature obtaining unit 450 would transfer the linked feature for the whole face to the Output Device 360 shown in FIG. 3 via the system bus 380 for displaying the processing results to the user or for the subsequence operations which will be described hereinafter, such as recognizing the facial expression, recognizing the face and so on.

(Configuration of a Facial Expression Recognition System)

As described in the first embodiment, the processing results (i.e. the linked feature for the whole face) output from the image processing apparatus 400 shown in FIG. 4 could be used for recognizing the facial expression. In the second embodiment, the configuration for image processing (i.e. facial expression recognition) by the image processing apparatus that is described above with reference of FIG. 3 will be described next with reference to FIG. 17. A facial expression recognition system of this embodiment which could also be regarded as an image processing apparatus has the same hardware configuration as described in FIG. 3.

Figure 17:
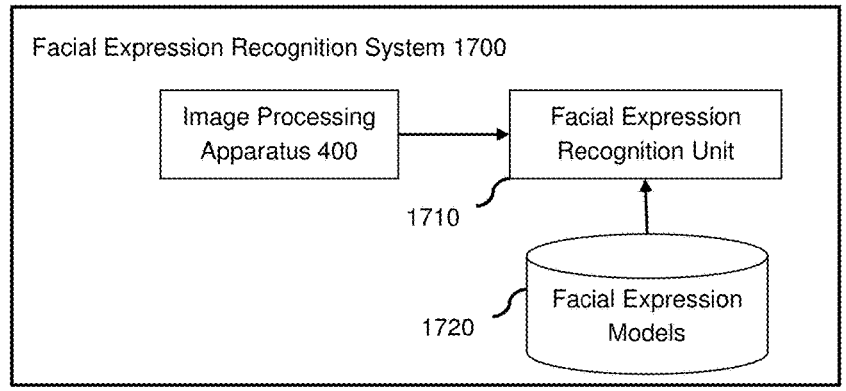
FIG. 17 is a block diagram illustrating the configuration of image processing apparatus according to the second embodiment of the present invention.

FIG. 17 is a block diagram illustrating the configuration of image processing apparatus (i.e. facial expression recognition system 1700) according to the second embodiment of the present invention.

Blocks shown in FIG. 17 are implemented as the CPU 310 of the image processing apparatus that is described above with reference of FIG. 3 and used for executing programs loaded to the RAM 320 and for cooperating with each of the hardware shown in FIG. 3. Some or all of the blocks could be implemented by dedicated hardware.

As shown in FIG. 17, the facial expression recognition system 1700 according to the second embodiment of the present invention comprises: the above-mentioned image processing apparatus 400, a facial expression recognition unit 1710 and a pre-generated facial expression models 1720.

As for an input image containing a face, first, the image processing apparatus 400 would obtain a linked feature for the whole face according to the above-mentioned description with reference of FIGS. 4~16.

And then, the facial expression recognition unit 1710 would recognize facial expression category of the face in the input image based on the obtained linked feature for the whole face and the pre-generated facial expression models 1720, wherein one facial expression category corresponds to one pre-generated facial expression model, the pre-generated facial expression models 1720 could be generated or trained by the manufacture based on a plurality of image samples with various different expressions (such as anger expression, smile expression, neutral expression, sadness expression and so on) beforehand and could be stored in the ROM 330 or the Hard Disk 340 shown in FIG. 3. As an example, the pre-generated facial expression models 1720 could be generated based on Support Vector Machine (SVM) algorithm, wherein the features used for generating the facial expression models could be the features obtained according to the present invention.

And finally, the facial expression recognition unit 1710 would transfer the recognized facial expression category of the face to the Output Device 360 shown in FIG. 3 via the system bus 380 for displaying the processing results to the user or for the subsequence operations which will be described hereinafter, such as evaluating quality of the online education and so on.

In addition, the facial expression recognition unit 1710 could implement the recognition in a variety of manners. For example, in one implementation, the facial expression recognition unit 1710 could implement the recognition in a so-called "one-against-all" manner. In this manner, the facial expression recognition unit 1710 would calculate confidence scores between the linked feature for the whole face and the generated facial expression models 1720, and then would directly recognize the facial expression category of the face based on the calculated confidence scores, such as the facial expression category corresponding to the highest confidence score could be recognized as the facial expression category of the face.

In another implementation, the facial expression recognition unit 1710 could implement the recognition in a so-called "one-against-one" manner. In this manner, the facial expression recognition unit 1710 would calculate confidence scores between the linked feature for the whole face and the generated facial expression models 1720 and would vote between each two pre-generated facial expression models, wherein the voting needs to be operated in $C_n^2$ rounds and n is the total number of the pre-generated facial expression models. And then the facial expression recognition unit 1710 would recognize the facial expression category corresponding to the pre-generated facial expression model which has the highest voting score as the facial expression category of the face.

As described in the first embodiment, the dimension of the features used in the image processing apparatus 400 could be reduced, and the image processing apparatus 400 could maintain the image processing accuracy (i.e. the accuracy of the features which would be used for facial expression recognition could be maintained), therefore the dimension of the features used in the facial expression recognition system 1700 could also be reduced, and accuracy of the facial expression recognition could also be maintained.

(Overall Processing)

Figure 18:
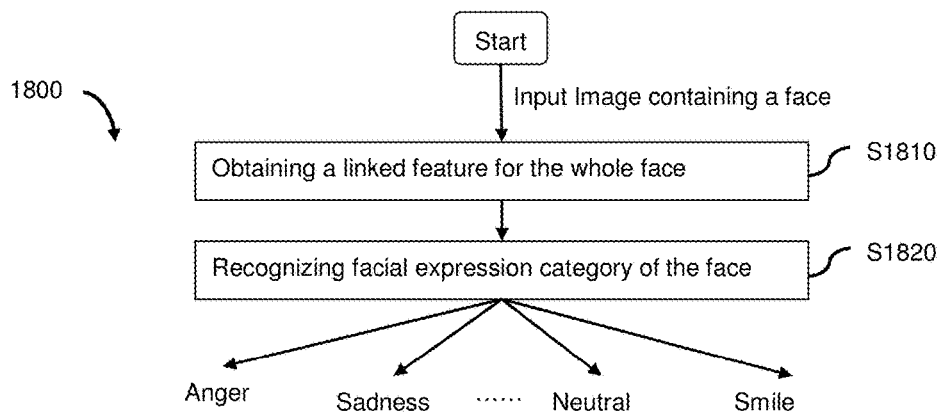
FIG. 18 is a flowchart schematically showing the procedure of overall processing according to the second embodiment.

Overall processing executed by the configuration of the second embodiment will be described with reference to FIG. 18. FIG. 18 is a flowchart 1800 schematically showing the procedure of overall processing according to the second embodiment.

First, in image processing step S1810, as for an input image containing a face, the image processing apparatus 400 would obtain a linked feature for the whole face according to the above-mentioned description with reference of FIGS. 4~16.

And then, in facial expression recognition step S1820, the facial expression recognition unit 1710 would recognize facial expression category of the face, such as the smile expression or sadness expression or other facial expression, in the input image based on the obtained linked feature for the whole face and the pre-generated facial expression models 1720.

And finally, the facial expression recognition unit 1710 would transfer the recognized facial expression category of the face to the Output Device 360 shown in FIG. 3 via the system bus 380 for displaying the processing results to the user or for the subsequence operations which will be described hereinafter, such as evaluating quality of the online education and so on.

(An Online Education Evaluating System)

As described above, the recognition results (i.e. the recognized facial expression category of the face) output from the facial expression recognition system 1700 shown in FIG. 17 could be used for evaluating quality of the online education. Therefore, as an exemplary application of the above-mentioned facial expression recognition, the entire constitution of an online education evaluating system will be described next with reference to FIG. 19. FIG. 19 is a block diagram showing the entire constitution of an online education evaluating system 1900 applying the facial expression recognition according to the second embodiment.

Figure 19:
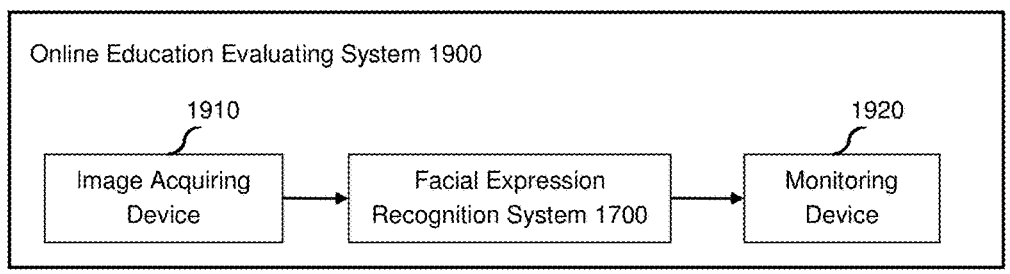
FIG. 19 is a block diagram showing the entire constitution of an online education evaluating system applying the facial expression recognition according to the second embodiment.

As shown in FIG. 19, the online education evaluating system 1900 according to the present invention comprises an image acquiring device 1910, the above-mentioned facial expression recognition system 1700 and a monitoring device 1920.

During one online education classroom, the image acquiring device 1910 could track and capture each student's face image real time. As described above in FIG. 3, the image acquiring device 1910 could be connected with the facial expression recognition system 1700 via the network for example. And the image acquiring device 1910 could be any kind of electronic device as long as they can track and capture images, such as web camera, digital camera, television camera, video camera, mobile phone, personal data assistant (PDA), laptop, or other suitable electronic device.

Figure 1B:
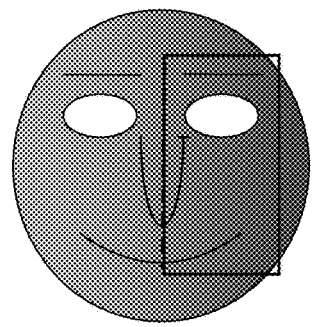

And each student's face images captured by the image acquiring device 1910 could be transmitted to the Input Device 350 of the facial expression recognition system 1700. The facial expression recognition system 1700 would recognize facial expression category of the face in each acquired face image according to the above-mentioned description with reference of FIGS. 1/~18.

And then, the Output Device 360 of the facial expression recognition system 1700 would output the facial expression recognition results to the monitoring device 1920. As described above in FIG. 3, the monitoring device 1920 could also be connected with the facial expression recognition system 1700 via the network for example. And the monitoring device 1920 could be any kind of electronic device as long as they can display the facial expression recognition results to the user, such as liquid crystal display.

During the whole classroom, if the recognized facial expression categories about most of the students are the smile expression, it probably means that most of the students are enjoying this online class. Thus, the online education evaluating system 1900 could be used to evaluate and improve the quality of the online education by utilizing the students' facial expression.

(Configuration of a Face Recognition System)

As described in the first embodiment, the processing results (i.e. the linked feature for the whole face) output from the image processing apparatus 400 shown in FIG. 4 could be used for recognizing the face. In the third embodiment, the configuration for image processing (i.e. face recognition) by the image processing apparatus that is described above with reference of FIG. 3 will be described next with reference to FIG. 20. A face recognition system of this embodiment which could also be regarded as an image processing apparatus has the same hardware configuration as described in FIG. 3.

Figure 20:
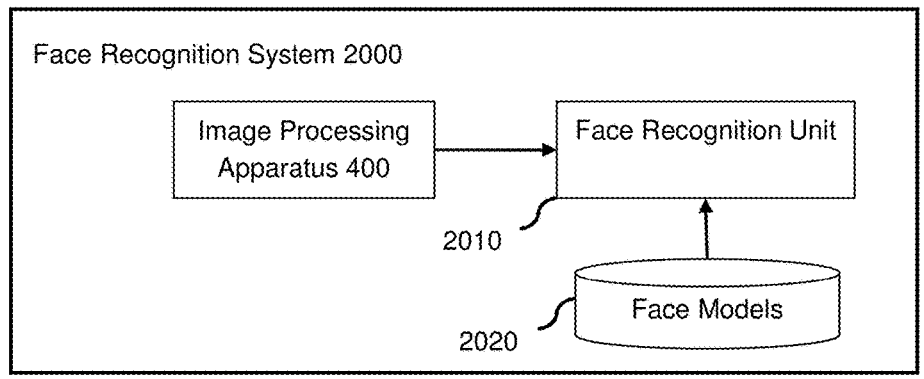
FIG. 20 is a block diagram illustrating the configuration of image processing apparatus according to the third embodiment of the present invention.

FIG. 20 is a block diagram illustrating the configuration of image processing apparatus (i.e. face recognition system 2000) according to the third embodiment of the present invention.

Blocks shown in FIG. 20 are implemented as the CPU 310 of the image processing apparatus that is described above with reference of FIG. 3 and used for executing programs loaded to the RAM 320 and for cooperating with each of the hardware shown in FIG. 3. Some or all of the blocks could be implemented by dedicated hardware.

As shown in FIG. 20, the face recognition system 2000 according to the third embodiment of the present invention comprises: the above-mentioned image processing apparatus 400, a face recognition unit 2010 and a pre-generated face models 2020.

As for an input image containing a face, first, the image processing apparatus 400 would obtain a linked feature for the whole face according to the above-mentioned description with reference of FIGS. 4~16.

And then, the face recognition unit 2010 would recognize the face in the input image based on the obtained linked feature for the whole face and the pre-generated face models 2020, wherein one face corresponds to one pre-generated face model, the pre-generated face models 2020 could be generated or trained by the manufacture based on a plurality of image samples about different persons beforehand and could be stored in the ROM 330 or the Hard Disk 340 shown in FIG. 3. As an example, the pre-generated face models 2020 could also be generated based on SVM algorithm, wherein the features used for generating the face models could be the features obtained according to the present invention.

And finally, the face recognition unit 2010 would transfer the recognized face to the Output Device 360 shown in FIG.

3 via the system bus 380 for displaying the processing results to the user or for the subsequence operations which will be described hereinafter, such as storing the captured image based on the recognized face in a digital camera and so on.

In addition, the face recognition unit 2010 could also implement the recognition in a variety of manners, such as the "one-against-all" manner and "one-against-one" manner described in the second embodiment.

As described in the first embodiment, the dimension of the features used in the image processing apparatus 400 could be reduced, and the image processing apparatus 400 could maintain the image processing accuracy (i.e. the accuracy of the features which would be used for face recognition could be maintained), therefore the dimension of the features used in the face recognition system 2000 could also be reduced, and accuracy of the face recognition could also be maintained.

(Overall Processing)

Figure 21:
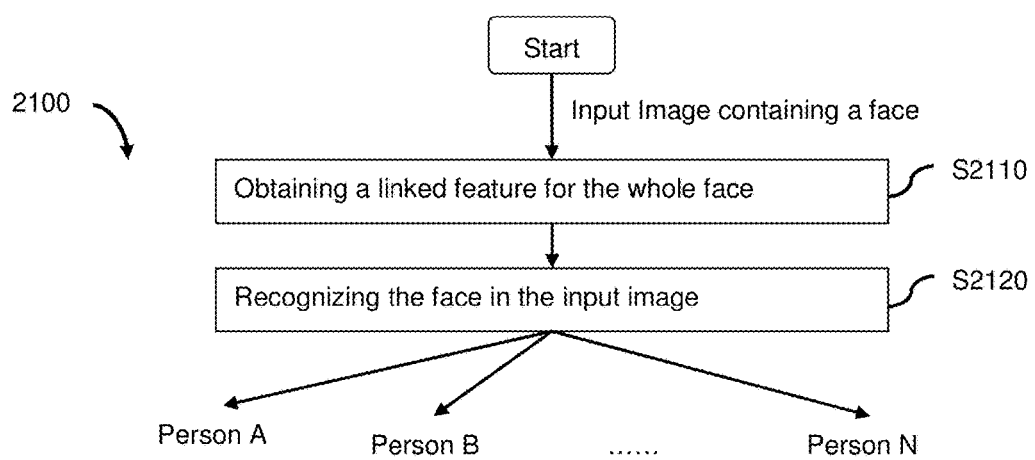
FIG. 21 is a flowchart schematically showing the procedure of overall processing according to the third embodiment.

Overall processing executed by the configuration of the third embodiment will be described with reference to FIG. 21. FIG. 21 is a flowchart 2100 schematically showing the procedure of overall processing according to the third embodiment.

First, in image processing step S2110, as for an input image containing a face, the image processing apparatus 400 would obtain a linked feature for the whole face according to the above-mentioned description with reference of FIGS. 4~16.

And then, in face recognition step S2120, the face recognition unit 2010 would recognize the face, such as person A's face, or person B's face or other person's face, in the input image based on the obtained linked feature for the whole face and the pre-generated face models 2020.

And finally, the face recognition unit 2010 would transfer the recognized face to the Output Device 360 shown in FIG. 3 via the system bus 380 for displaying the processing results to the user or for the subsequence operations which will be described hereinafter, such as storing the captured image based on the recognized face in a digital camera and so on.

Taking a image which is captured by a digital camera and contains a face of the person A for example, wherein the face recognition system 2000 described with reference to FIG. 20 are applied in the digital camera, after the face recognition system 2000 recognizes that the face in this captured image is the person A's face, the digital camera could store this captured image into the folder that is specially used to store the person A's image. Furthermore, the face recognition system 2000 could be implemented by hardware and/or software in the digital camera. In one implementation, a module or an apparatus that could carry out the face recognition could be incorporated into the digital camera, and thus the digital camera would have the corresponding face recognition function. In another implementation, a software program that could carry out the face recognition could be stored in a storage device of the digital camera, and thus the digital camera would also have the corresponding face recognition function.

All of the units described above are exemplary and/or preferable modules for implementing the processes described in the present disclosure. These units can be hardware units (such as a Field Programmable Gate Array (FPGA)), a digital signal processor, an application specific integrated circuit or the like) and/or software modules (such as computer readable program). The units for implementing the various steps are not described exhaustively above. However, where there is a step of performing a certain process, there may be a corresponding module or unit (implemented by hardware and/or software) for implementing the same process. Technical solutions by all combinations of steps described and units corresponding to these steps are included in the disclosure of the present application, as long as the technical solutions they constitute are complete and applicable.

Furthermore, if the image processing apparatus 400 shown in FIG. 4 or the facial expression recognition system 1700 shown in FIG. 17 or the face recognition system 2000 that is constituted of various units is partially or totally configured by software, it could be stored in the Hard Disk 340 shown in FIG. 3. In another aspect, if the image processing apparatus 400 shown in FIG. 4 or the facial expression recognition system 1700 shown in FIG. 17 or the face recognition system 2000 is partially or totally configured by hardware or firmware, it could also be incorporated into an electronic device, such as a digital camera, as a module, as long as there is a need for processing images in the electronic device.

It is possible to carry out the method and apparatus of the present invention in many ways. For example, it is possible to carry out the method and apparatus of the present invention through software, hardware, firmware or any combination thereof. The above described order of the steps for the method is only intended to be illustrative, and the steps of the method of the present invention are not limited to the above specifically described order unless otherwise specifically stated. Besides, in some embodiments, the present invention may also be embodied as programs recorded in recording medium, including machine-readable instructions for implementing the method according to the present invention. Thus, the present invention also covers the recording medium which stores the program for implementing the method according to the present invention.

Although some specific embodiments of the present invention have been demonstrated in detail with examples, it should be understood by a person skilled in the art that the above examples are only intended to be illustrative but not to limit the scope of the present invention. It should be understood by a person skilled in the art that the above embodiments can be modified without departing from the scope and spirit of the present invention. The scope of the present invention is defined by the attached claims.

What is claimed is:

1. An image processing apparatus, comprising:
   an image acquisition unit configured to acquire an image containing a face;
   a region location unit configured to locate at least one region which represents attributes of the face in the acquired image;
   a feature extraction unit configured to extract features from the located regions; and
   a feature integration unit configured to integrate the features of the located regions which are symmetrical with each other based on symmetry of the face.

2. The apparatus according to claim 1, wherein the feature integration unit comprising:
   a feature combination unit configured to, as for one located region:
      combine the features of the located region with the features of the symmetrical region of the located region, in case a center of the located region is not on a symmetrical line of the face; and
      combine the features of first sub-region of the located region with the features of second sub-region of the located region, incase the center of the located region is on the symmetrical line of the face; wherein the located region is divided into the first sub-region and the second sub-region by the symmetrical line of the face.

3. The apparatus according to claim 2, wherein the feature integration unit further comprising:
an occluded region determination unit configured to, as for one located region, determine whether the located region is an occluded region or not;
a feature re-determination unit configured to, as for one occluded region, re-determine the features of the occluded region according to the features of the corresponding located region which are symmetrical with the occluded region based on the symmetry of the face.

4. The apparatus according to claim 3, wherein the feature re-determination unit:
re-determines the features of the occluded region or the features of the symmetrical region of the occluded region based on size of occluded area of the occluded region and size of occluded area of the symmetrical region, in case the center of the occluded region is not on the symmetrical line of the face; and
re-determines the features of the first sub-region or the second sub-region of the occluded region based on size of occluded area of the first sub-region and size of occluded area of the second sub-region, in case the center of the occluded region is on the symmetrical line of the face.

5. The apparatus according to claim 4, wherein the feature re-determination unit:
determines the features of the symmetrical region as the features of the occluded region in case the size of occluded area of the occluded region is larger than that of the symmetrical region; otherwise, determines the features of the occluded region as the features of the symmetrical region; and
determines the features of the first sub-region as the features of the second sub-region in case the size of occluded area of the first sub-region is less than that of the second sub-region; otherwise, determines the features of the second sub-region as the features of the first sub-region.

6. The apparatus according to claim 1, wherein the region location unit comprising:
a feature point detection unit configured to detect feature points in the acquired image; and
a region determination unit configured to determine the regions based on the detected feature points.

7. The apparatus according to claim 1, wherein, as for one located region, the feature extraction unit:
divides the located region into a plurality of blocks with same size of area; and
extracts features from the divided blocks.

8. The apparatus according to claim 1, further comprising:
a face feature obtaining unit configured to link the integrated features to obtain a feature for the face.

9. The apparatus according to claim 8, further comprising:
a facial expression recognition unit configured to recognize facial expression category of the face in the acquired image based on the obtained feature for the face and pre-generated facial expression models.

10. The apparatus according to claim 8, further comprising:
a face recognition unit configured to recognize the face in the acquired image based on the obtained feature for the face and pre-generated face models.

11. An image processing method, comprising:
image acquisition step of acquiring an image containing a face;
region location step of locating at least one region which represents attributes of the face in the acquired image;
feature extraction step of extracting features from the located regions; and
feature integration step of integrating the features of the located regions which are symmetrical with each other based on symmetry of the face.

12. The method according to claim 11, further comprising:
face feature obtaining step of linking the integrated features to obtain a feature for the face.

13. The method according to claim 12, further comprising:
facial expression recognition step of recognizing facial expression category of the face in the acquired image based on the obtained feature for the face and pre-generated facial expression models.

14. The method according to claim 12, further comprising:
face recognition step of recognizing the face in the acquired image based on the obtained feature for the face and pre-generated face models.

* * * * *